United States Patent
Coakley et al.

(10) Patent No.: US 9,178,938 B2
(45) Date of Patent: Nov. 3, 2015

(54) COLLABORATION AND INTERACTION WITH SYSTEM TERMINALS

(71) Applicant: International Business Machines Corporation, Armonk, NY (US)

(72) Inventors: James Coakley, New York, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 14/102,960

(22) Filed: Dec. 11, 2013

(65) Prior Publication Data

US 2014/0101241 A1   Apr. 10, 2014

Related U.S. Application Data

(63) Continuation of application No. 13/354,886, filed on Jan. 20, 2012.

(51) Int. Cl.
  G06F 15/16 (2006.01)
  H04L 29/08 (2006.01)
  H04L 29/06 (2006.01)

(52) U.S. Cl.
  CPC ............ *H04L 67/10* (2013.01); *H04L 65/1069* (2013.01); *H04L 65/4015* (2013.01)

(58) Field of Classification Search
  USPC ......................................................... 709/203
  See application file for complete search history.

(56) References Cited

U.S. PATENT DOCUMENTS

| | | | |
|---|---|---|---|
| 7,466,713 B2 | 12/2008 | Saito | |
| 7,840,728 B1 | 11/2010 | Sivertsen | |
| 7,849,192 B2 | 12/2010 | Brandstatter et al. | |
| 8,131,825 B2 | 3/2012 | Nord et al. | |
| 8,176,186 B2 | 5/2012 | McCanne et al. | |
| 8,271,632 B2 | 9/2012 | Kobayashi et al. | |
| 8,429,630 B2 | 4/2013 | Nickolov et al. | |
| 8,650,494 B1 * | 2/2014 | Sampath et al. | 715/740 |
| 8,675,488 B1 | 3/2014 | Sidebottom et al. | |
| 8,751,844 B2 | 6/2014 | Mazzaferri et al. | |
| 8,782,186 B2 | 7/2014 | Shaw et al. | |

(Continued)

FOREIGN PATENT DOCUMENTS

WO   WO2009049177 A1   4/2009

OTHER PUBLICATIONS

Lee et al., "Extending VNC for Effective Collaboration," Third International Forum on Strategic Technologies, IFOST 2008, Jun. 23-29, 2008, Novosibirsk-Tomsk, Russia, IEEE; pp. 343-346.

*Primary Examiner* — Melvin H Pollack
(74) *Attorney, Agent, or Firm* — Cantor Colburn LLP; Steven Chiu (57) ABSTRACT

A technique is provided for session aggregation in a distributed architecture having a server connected to blades. A master session is generated for collaboration by user clients, and the master session corresponds to one or more terminal sessions on the distributed architecture of the server connected to the blades. The one or more terminal sessions on the distributed architecture are aggregated in the master session. A determination is made that the user clients agree for one user client of the user clients to be authorized as a current command line user name, in response to requests that are sent to the user clients. The one user client is granted authorization to the current command line user name in the master session based on an agreement by the user clients.

4 Claims, 9 Drawing Sheets

(56) References Cited

U.S. PATENT DOCUMENTS

| | | |
|---|---|---|
| 8,850,060 B1 | 9/2014 | Beloussov et al. |
| 8,868,724 B2 * | 10/2014 | Goodwin et al. ............ 709/224 |
| 8,903,884 B2 | 12/2014 | Vasters et al. |
| 8,924,571 B2 | 12/2014 | Pratt et al. |
| 2010/0268828 A1 | 10/2010 | Pahlavan et al. |
| 2011/0004680 A1 | 1/2011 | Ryman |
| 2011/0072175 A1 | 3/2011 | Liaw et al. |
| 2012/0317276 A1 | 12/2012 | Muniraju |
| 2012/0324365 A1 | 12/2012 | Momchilov et al. |
| 2013/0166447 A1 | 6/2013 | Theado et al. |
| 2013/0301415 A1 | 11/2013 | Archer et al. |
| 2014/0019607 A1 | 1/2014 | Beste et al. |

\* cited by examiner

COLLABORATION AND INTERACTION WITH SYSTEM TERMINALS

This application is a continuation of U.S. application Ser. No. 13/354,886 (Coakley et al.), filed on Jan. 20, 2012, which is herein incorporated by reference in its entirety.

BACKGROUND

The present invention relates to communications, and more specifically, to the collaboration and interaction of computer systems with remote computers.

Users typically connect to mainframe computers (e.g., System Z®) using a 3270 terminal emulator such as IBM® Personal Communications (PCOMM). PCOMM is a host communication and terminal emulation package that features 3270, 5250, virtualization (VT) emulation, etc.

Terminal emulators typically connect to the mainframe using transmission control protocol/Internet Protocol (TCP/IP). A session is identified by IP addresses, which specify the computers that participate in it, and port numbers, which identify the programs on those computers. The telnet port may be utilized on the mainframe to listen for terminal emulators.

SUMMARY

According to exemplary embodiments, a computer program product, system, and method include a tangible storage medium readable by a processing circuit and instructions stored for execution by the processing circuit for performing the method. The method is for session aggregation in a distributed architecture having a server operatively connected to multiple blades. A master session for collaboration by user clients is generated. The master session corresponds to one or more terminal sessions on the distributed architecture of the server operatively connected to the blades. The one or more terminal sessions on the distributed architecture are aggregated in the master session. A determination is made that the user clients agree for one user client of the user clients to be authorized as a current command line user name, in response to requests that are sent to the user clients. The one user client is granted authorization to the current command line user name in the master session based on an agreement by the user clients.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments are configured allow one or more user clients to operatively connect to terminal sessions running on a server operatively connected to blades (i.e., blade servers) in a distributed computer architecture. The server may have various workloads and can assign processes (for the workloads) to different connected blades, and an aggregation layer (i.e., middle layer software) allows the user clients to interact with workloads on the server via a terminal session. Also, the aggregation layer allows the user clients to see beyond the server and interact with processes on the blades via terminal sessions. The terminal sessions may include functionality for session persistence, session collaboration, session aggregation, session breakout, and session scale.

Figure 1:
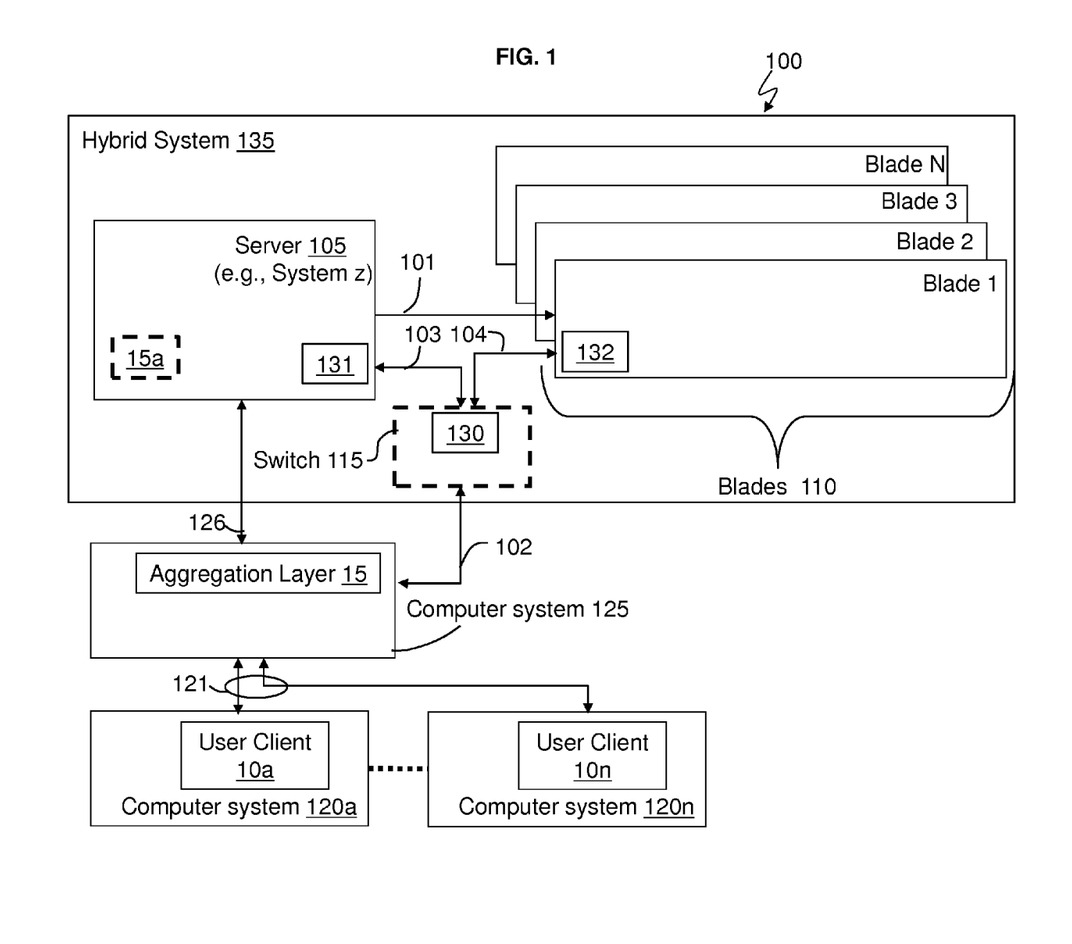
FIG. 1 illustrates a block diagram of an architecture according to an embodiment of the present invention.

Turning now to FIG. 1, a block diagram 100 of an architecture is generally shown according to an embodiment. The block diagram 100 includes a hybrid system 135, which shows a distributed computer architecture of a server 105 operatively connected to blades 110. The server 105 may be a mainframe (computer system) and operatively connected, e.g., via a network, cables, and/or link 101 to a plurality of blades 110. The server 105 may be a System Z® computer system. Each blade 110, also referred to as a blade server, may be a server computer with a modular design optimized to minimize the use of physical space and energy. The blades 110 may be in a BladeCenter® location, and there may be blades 1-N available for processing, where N represents the last blade.

The server 105 is configured to offload (designate/assign) processes (of one or more workloads) to the individual blades 110 (e.g., blades 1-N) utilizing the distributed computer architecture.

There may be various user clients 10a-10n (generally referred to as user client 10) each on respective computer systems 120a-n (generally referred to as computer system 120). The user client 10, which can be a software program running on the computer system 120, is configured to open a terminal session on the server 105 through an aggregation layer 15. The operator of the user client 10 may log into the server 105 to open the terminal session(s), and the aggregation layer 15 intercepts the login request and opens the terminal session(s) with user client 10 and the server 105 and/or blades 1-N of blades 110. The aggregation layer 15 (which is a middle layer) may be one or more software programs stored and running on a computer system 125, such as a server, and/or may optionally be stored and running on the server 105. The aggregation layer on the server 105 is shown in a dashed box as aggregation layer 15a. Any reference to the function, features, and logic of aggregation layer 15 on the computer system 125 applies to the aggregation layer 15a running on the server 105. The computer system 120 (of user clients 10) may be operatively connected to the computer system 125 via a network, cables, and/or links 121. The computer system 125 may be operatively connected to the server 105 via a network, cables, and/or link 126.

By the aggregation layer 15, the operator may run the user client 10 to open/instantiate terminal sessions on the server 105 and/or blades 110 in which the operator can input commands, view workloads, and view processes running on the server 105 and/or individual blades 110. Additionally, in an open architecture, the hybrid system 135 may include and utilize a switch 115 (optionally shown with dashed lines) and listeners 130, 131, and 132. In the closed architecture, the server 105 is operatively connected to its blades 110 by the link 101 (e.g., the hybrid system 135 may not include the switch 115 and/or the aggregation layer 15 may not utilize the switch 115). In one implementation of the open architecture, the link 101 may be removed (or not utilized), and the server 105 is operatively connected to the blades 110 by the switch 115 via links 103 and 104. Also, the aggregation layer 15 (on the computer system 125) may be connected to the switch 115 by a network, cables, and/or link 102. In the open architecture, all communication traffic between the server 105 and the blades 110 flows through the switch 115.

A workload is a collection of address spaces on the server 105 (e.g., System Z® server) and processes running on the blades 110. The workload may be the responsibility of the server 105, and the server 105 can assign/distribute the processes of the workload to various connected blades 110. A terminal session is opened by the aggregation layer 15 (and/or the server 105) after receiving a request from the user client 10. The operator can make the request to open one or more terminal sessions on the server 105 and blades 110 in a displayable operator panel (graphical user interface) of the user client 10. The operator views, monitors, and inputs commands in a user session (in the operator panel) of user client 10 that corresponds to the terminal session on the server 105 and/or the terminal session of the blades 110. A terminal session is the interaction between a dedicated terminal and a server or the interaction between a terminal application in a desktop machine and a server. Conventionally, a terminal session does not allow (direct) interaction with blades 110 which are connected to and run in the background of the server 105. However, the aggregation layer 15 is configured to allow multiple user clients 10 (e.g., user clients 10a-10n) on various computer systems 120 (e.g., computer system 120a-120n) to (directly) interact with each respective blade 1-N as well as the server 105, via the switch 115. The aggregation layer 15 is configured to allow commands (of workloads) to be traced to each target blade 1-N, for monitoring by the user client 10.

For ease of explanation, user session, terminal window, operator panel, and/or session window on the user client 10 may be utilized to indicate the operable connection into the terminal session on server 105 and/or blades 110, for monitoring and commands by the operator. One skilled in the art understands that a terminal session can refer to the operable connection of the user client 10 (i.e., user session) to the server 105/blades 110. When the operator opens a session (user session, terminal window, etc.,), it is understood that a terminal session is opened on the server 105 and/or blades 110. In a remote control operation, the terminal window on the user client 10 displays the screen of the remote machine (i.e., the server 105 and/or the blades) that it is controlling during the terminal session. For remote execution of a program and/or commands, the terminal window/user sessions in a graphical interface is used to display a command line to the operator of the user client 10. The terminal window can be utilized by the operator to perform a myriad of operations as understood by one skilled in the art.

The aggregation layer 15 and/or server 105 connects terminal sessions to the user session opened in the user client 10. For example, the aggregation layer 15 provides visibility into the System Z® address space of the server 105 using, e.g., USS (Unix System Services) interfaces and/or MVS™ (Multiple Virtual Storage) interfaces. The operator may interact with the workloads on the server 105 using the terminal session of the user client 10. When the aggregation layer 15 interfaces with the (System Z®) server 105 and blades 110 via the switch 115, any listener 130, 131, and/or 132 can parse communication traffic on the links 103 and 104 and relay/transfer the communication traffic data to the aggregation layer 15 via the link 102 and/or the link 126. Also, as noted above, the aggregation layer 15 may optionally be on the server 105 as aggregation layer 15a. The listener 130, 131, and/or 132 may attach to processes (running on the blades 110) and/or attach to address spaces (on the server 105) to allow control and collection of information for the user session on the user client 10. In one implementation, the listener 130, 131, and/or 132 may be a library compiled into the (memory) address space (on the server 105) and/or an additional software application (e.g., listening process running on the blades 110, the server 105, and/or the switch 115) capable of supplying signals for processes requiring monitoring and interaction. The listener 130 on the switch 115 is capable of deconstructing packets (in the communication traffic between server 105 and respective blades 110) to determine interaction command information between an address space on the server 105 and each respective corresponding process running on individual blades 1-N of blades 110. The operator of the user/terminal session(s) on user client 10 (e.g., user client 10a) can make annotations which may be communicated to other operators. One operator can have numerous terminal sessions (e.g., terminal session 1-1000) opened on the user client 10 which correspond to the respective terminal sessions on the server 105 and blades 110. The aggregation layer 15 may map the 1-1000 terminal sessions on the servers 105 and/or blades 110 to a single user session/terminal window in the user client 10. Also, multiple operators can have multiple user sessions (corresponding to multiple terminal sessions) opened on their respective user clients 10a-n. Annotations to terminal sessions are stored in the aggregation layer 15 for each terminal session, and stored for each individual operator inputting commands on the command line. The command line in a terminal session allows the operator to input a command via his or her user client 10a-n; then the operator (via the user session on the user client 10) can observe and monitor: how the server 105 utilizes its (memory) address space to process the command, which particular blade 1-N of blades 110 is assigned by the server 105 to process this command, and the running of the process on the assigned blade 110.

Figure 2:
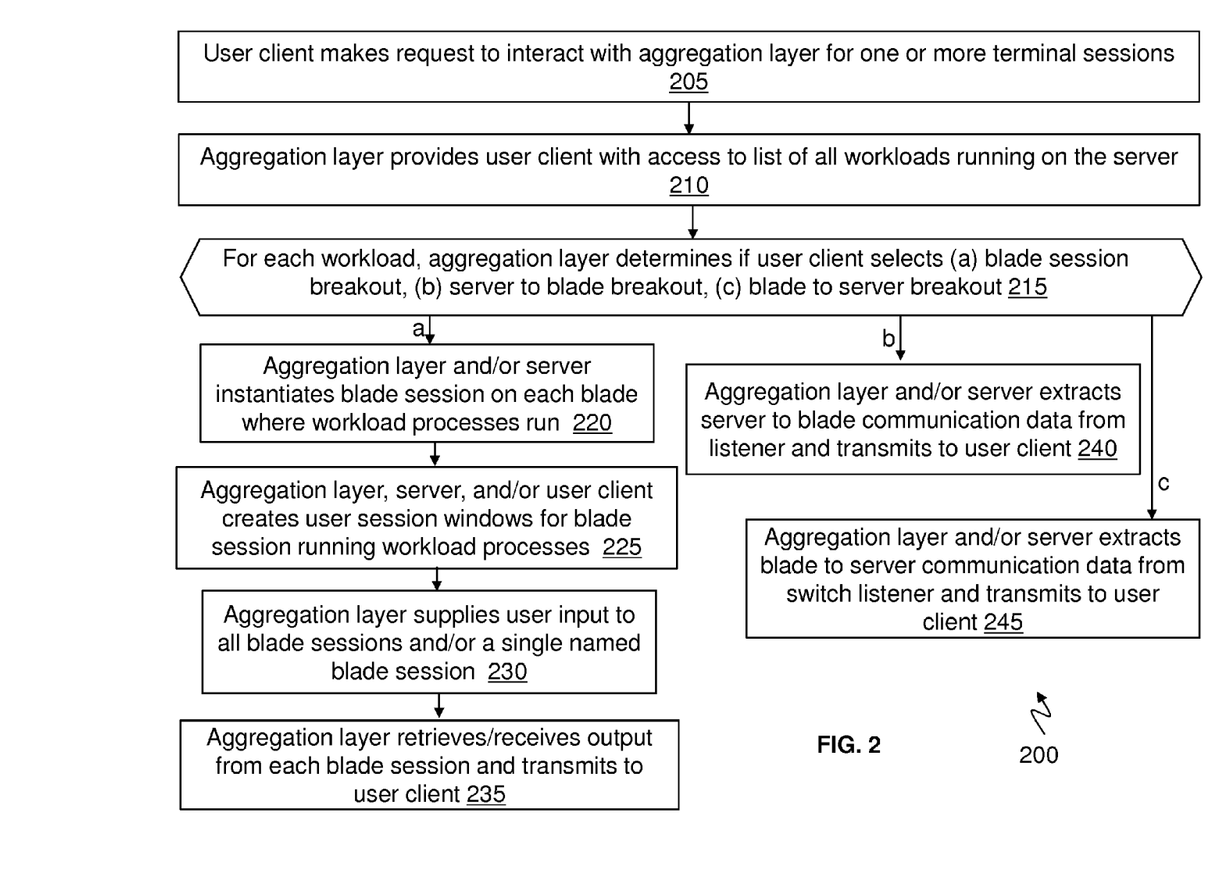
FIG. 2 illustrates a flow chart for monitoring, controlling, and/or interacting with workloads on a server and/or blades according to an embodiment of the present invention.
Figure 3A:
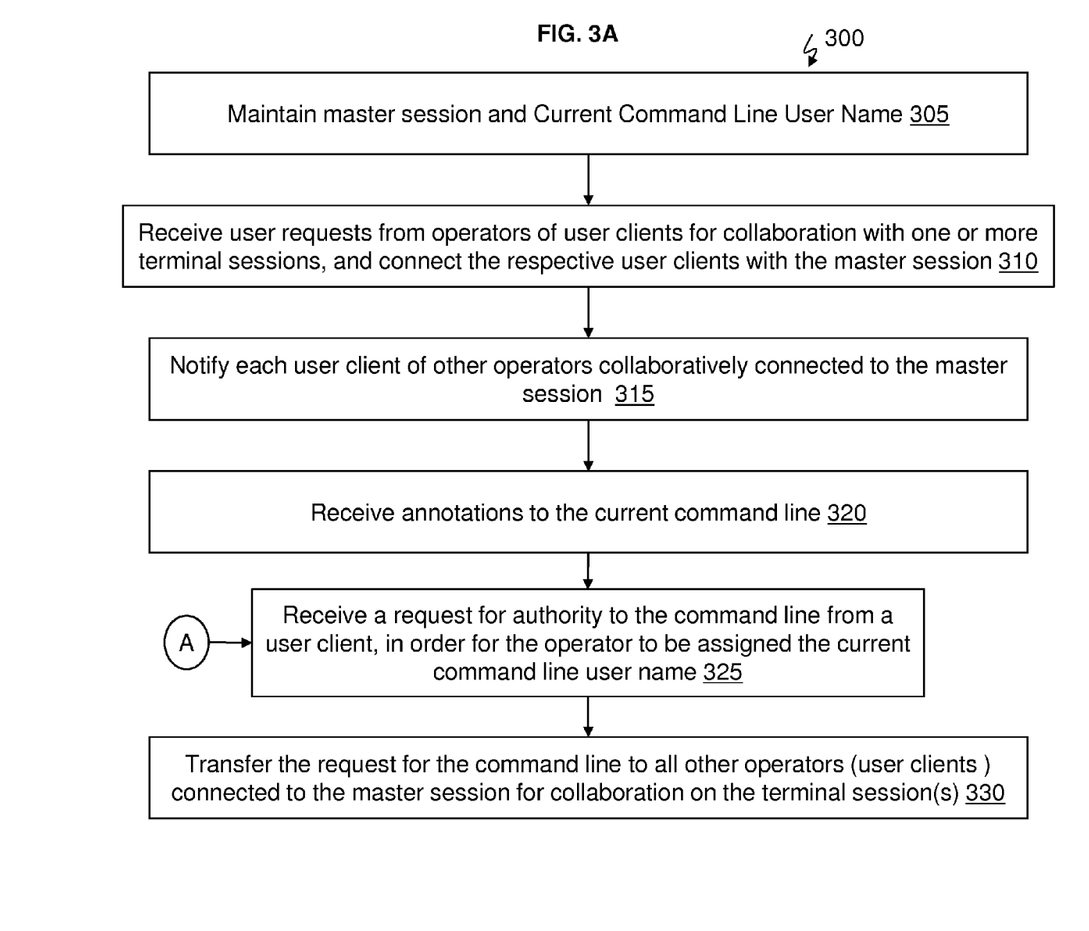
FIGS. 3A and 3B illustrate a flow chart of terminal session collaboration for aggregated sessions according to an embodiment of the present invention.
Figure 3B:
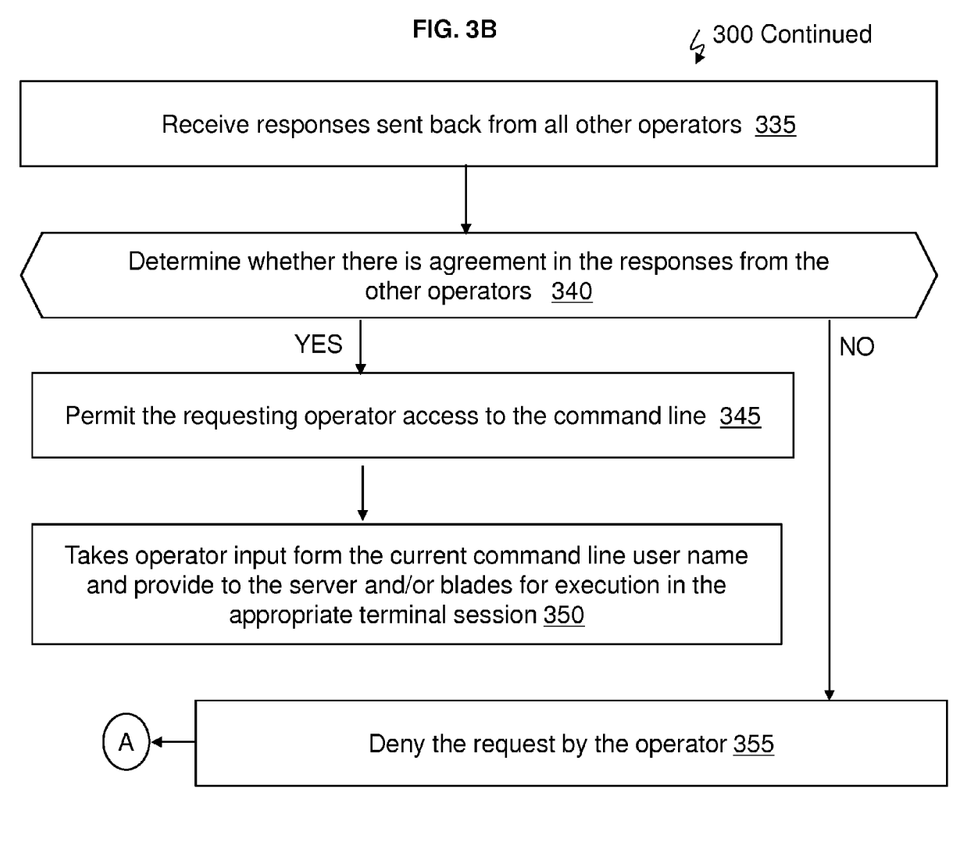
Figure 4:
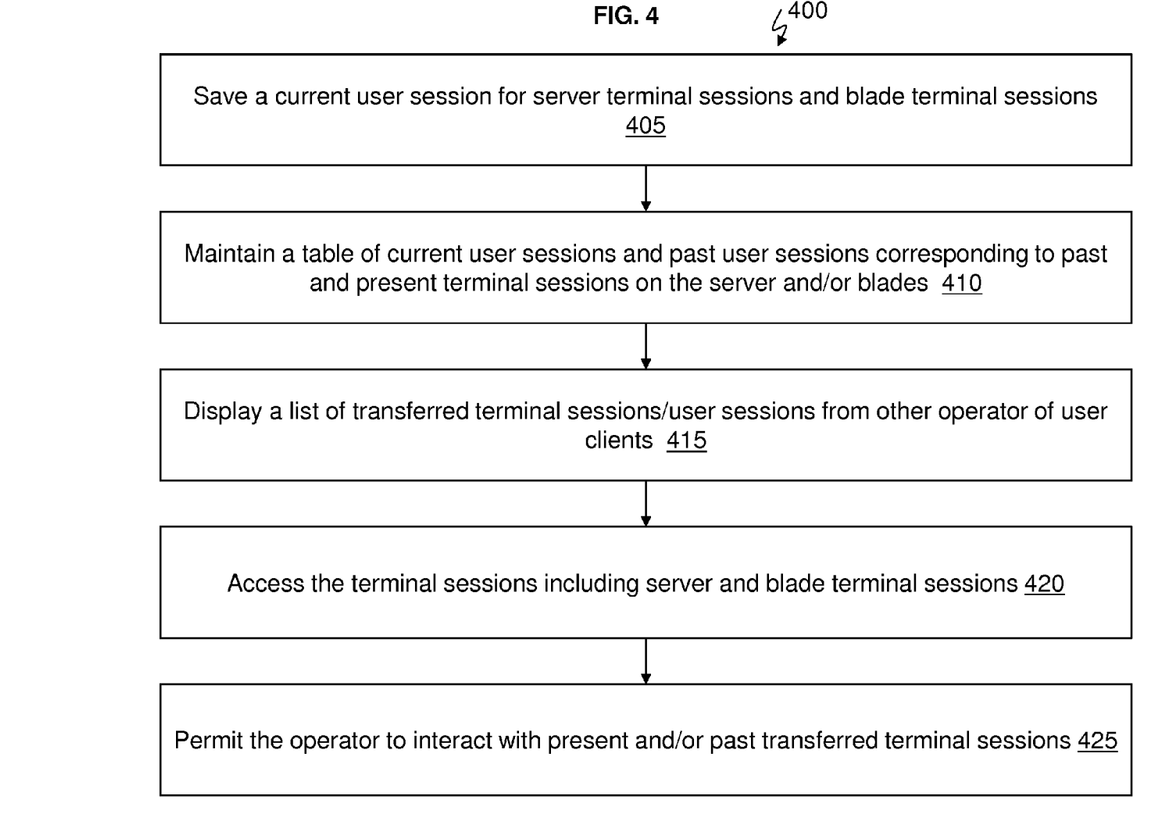
FIG. 4 illustrates a flow chart for session transfer of aggregated terminal sessions according to an embodiment of the present invention.

Three flow sequences in FIGS. 2, 3, and 4 are provided below for workloads (and their corresponding processes) in a closed architecture or open architecture. Note that respective listeners 130, 131, and 132 may steer data into closed or open modes by direction of the operator on the user client 10 and/or the aggregation layer 15. Also, the server 105, blades 110, switch 115, computer systems 120, and computer system 125 each have the necessary software applications and hardware to operate as discussed herein. The hardware may include processors, memory, storage mediums, display screens, keyboards, mouse, etc., and further functionality and features can be utilized from computer 700 discussed below in FIG. 7, as understood by one skilled in the art.

Now turning to FIG. 2, a flow chart 200 illustrates monitoring, controlling, and/or interacting with workloads on the server 105 and/or individual blades 110 according to an embodiment.

The aggregation layer 15 may intercept a request from the user client 10 to open a terminal session on server 105 and/or blades 110 (which corresponds to user session/terminal window in the user client 10) to interact with a USS and/or MVS session at block 205. For subsequent interaction, the aggregation layer 15 acts as a proxy for the user client 10.

The aggregation layer 15 provides the user client 10 with access to a list of all workloads running on the server 105 via the aggregation layer 15 at block 210. The aggregation layer 15 is configured to generate the list of all workloads in the memory address space of the server 105. Via the terminal session(s), the operator can now have access to the memory address spaces on the server 105, and the workloads may have corresponding processes running on the blades 1-N.

For each workload in the list, user client 10 may select via the aggregation layer 15 the following (a) blades 110 session breakout, (b) server 105 to blade 110 breakout, and/or (c) blades 110 to server 105 breakout, and the one or more selections are received and executed by the aggregation layer 15 at block 215.

As received by the aggregation layer 15, if the operator selects (a) the blades 110 session breakout on the user client 10, then the blade terminal session is instantiated by the server 105 and/or the aggregation layer 15 on each blade 1-N of blades 110 where workload processes run at block 220. In one implementation for blade session breakout, the aggregation layer 15 provides for display in the user client 10 (all) the processes running on the blades 1-N. Via the aggregation layer 15, the operator of user client 10 can then select an individual blade 1-N for monitoring and control, and/or can choose to monitor and control all blades 110. If no workload processes are running on particular blades 1-N, then the server 105 and/or aggregation layer 15 is configured not to instantiate a terminal session on these particular blades 1-N.

For each of the blade terminal sessions instantiated on the blades 110, corresponding user session windows (i.e., user sessions, terminal windows, etc.) are created on the user client 10 by the aggregation layer 15 and/or the user client 10 at block 225. As noted above, the user sessions (terminal window) is a graphical user interface on the computer system 120 that corresponds to the terminal sessions instantiated on the server 105 and/or blades 110.

The aggregation layer 15 is configured to supply user input (e.g., commands) to all blade terminal sessions (of blades 110) if required and/or can target a single named terminal session running on a particular blade 110 (such as, e.g., blade 1) at block 230.

At block 235, output from each blade terminal session of the blades 1-N is relayed back to (i.e., received by) the aggregation layer 15 (via the link 102 and switch 115 and/or via the link 126 and server 105), and the aggregation layer 15 transmits the output to the user client 10 for monitoring and/or control by the operator at computer system 120. Also, the aggregation layer 15 may extract the output from the blades 110, e.g., via the listeners 130, 131, and/or 132, and provide the output to the user client 10. For example, the output from any of the blades 110 may consist of results (sent) back to the server 105 and/or requests to the server 105. Formats of results and/or requests are known to the aggregation layer, and these may be communicated to the listeners 130, 131, and/or 132 so that the listeners may parse data packets corresponding to a given terminal session.

If the user client 10 selects (b) server 105 to blade 110 breakout, then server 105 to blade 110 communication data is extracted by aggregation layer 15 from switch listener 130 (and/or listener 131) and displayed on user client 10 at block 240. Also, the server 105 may gather server to blade communication data and send to the user client 10 via the aggregation layer 15. Server to blade communication data includes the individual processing requests/assignments made to the individual blades 1-N by the server 105, individual blade addresses identifying the individual blades 1-N being assigned processing tasks/requests, and protocol information. In one implementation, the aggregation layer 15 may instantiate a terminal session on the server 105 to capture the server to blade communication data, and the terminal session may interact with the listener 130 and/or 131. As noted above, the aggregation layer 15 can connect the terminal session(s) to a corresponding user session in the user client 10 for monitoring and control.

If the user client 10 selects (c) blades 110 to server 105 breakout, then blade to server communication data is extracted from the switch listener 130 (and/or listener 132) by the aggregation layer 15 and displayed on user client 10 at 245. The blade to server communication data may include output for completed processes executed on the blades 110, responses to incomplete processes from the blades 110, and protocol information. In one implementation, the aggregation layer 15 may instantiate a terminal session on the blades 110 to capture the blade to server communication data, and the terminal session may interact with the listener 130 and/or 132. As noted above, the aggregation layer 15 can connect the terminal session(s) to a corresponding user session in the user client 10 for monitoring and control. Each blade 1-N may have it own listener 132 (although not shown for the sake of brevity).

Further, the aggregation layer 15 provides terminal session persistence on the server 105 and/or blades 110, using heartbeat messages from the aggregation layer 15 to the server 105 and/or blades 110. The operator may close the user client 10 on one computer system 120 and then restart the user client 10 on his or her other computer system 120; the user session will still remain active on the other computer system 120 such that the operator can interact with the same terminal session(s) as before. The (a) blade session breakout, (b) server to blade breakout, and/or (c) blade to server breakout allow the user client 10 via the aggregation layer 15 to trace any commands back and forth between the server 105 and any target blade 110. Additionally, any command entered in the user session of the user client 10 can be (simultaneously) applied to a terminal session on the server 105 and/or to individual terminal sessions on the blades 110.

FIGS. 3A and 3B illustrate a flow chart 300 for terminal session collaboration for aggregated user sessions according to an embodiment. There may be different user clients 10a-10n (i.e., different operators) desiring to collaborate on the workloads running on the server 105 and/or the processes running on the blades 110.

Figure 5:
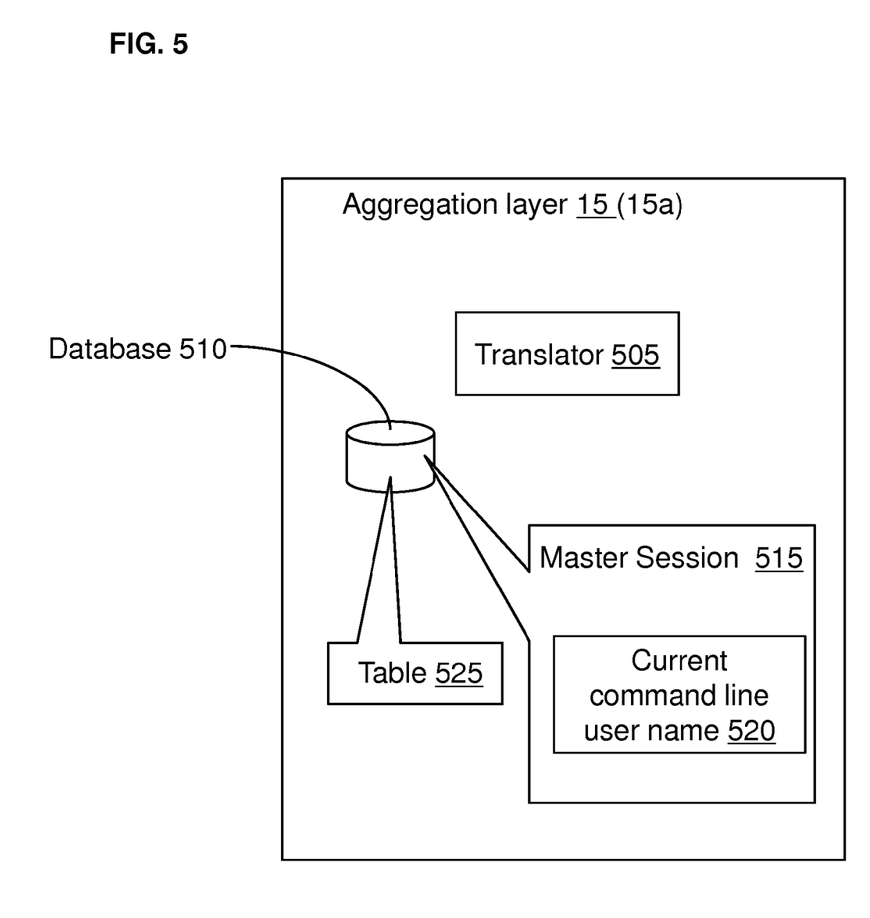
FIG. 5 illustrates further details of an aggregation layer according to an embodiment of the present invention.

The aggregation layer 15 is configured to provide session collaboration among the different operators of user clients 10a-10n each monitoring, inputting commands, and receiving data from the same terminal session(s) on the server 105 and/or the blades 1-N of blades 110. As such, the different user clients 10 can all interact with the same terminal session(s), while appearing as a single user client 10 (e.g., having a single session identification) to the server 105 and/or blades 1-N. Before continuing with FIGS. 3A and 3B, FIG. 5 illustrates further details of the aggregation layer 15, which includes a translator 505, a database 510 stored in memory, a master session 515, current command line user name 520, and a table 525 according to an embodiment.

Continuing with FIGS. 3A and 3B, the aggregation layer 15 maintains the master session 515 and the current command line user name 520 for one or more terminal sessions at block 305. The master session 515 coordinates the session collaboration of the operators on user client 10.

The aggregation layer 15 is configured to receive user requests from operators of user clients 10a-10n who are interested in collaboration on one or more terminal sessions, and the aggregation layer 15 is configured to connect the respective user clients 10a-10n with the master session 515 at block 310. The translator 505 of the aggregation layer 15 is configured to aggregate numerous (1-1000) terminal sessions (including blade terminal sessions on respective blades 1-N and server terminal session on the server 105) into a single terminal session that is displayed for interaction in a terminal window/user session on each user client 10a-10n via the master session 515.

Also, each user client 10a-10n may have its own session identification (which can be a number, alphabets, and/or an alphanumeric identification) for identifying the user client 10 with the terminal sessions running on the server 105 and/or blades 110. During collaboration, the translator 505 is configured to aggregate the numerous user clients 10a-10n each having their respective session identifications to appear as a single session identification to the server 105 and/or the blades 110 for the terminal session.

For the terminal session(s), the master session 515 of the aggregation layer 15 notifies each operator of the other operator participants (i.e., the other operators participating in the master session 515) via their respective user clients 10a-10n at block 315. Each terminal session (on the server 105 and/or blades 1-N) has a command line in which the operator can input (via the user client 10) a command via the terminal session to execute on the respective server 105 and/or blade 1-N.

The commands entered for the command line may be stored in a database (e.g., database 510 of FIG. 5) of the aggregation layer 15. The aggregation layer 15 is configured to allow each operator to annotate previous command lines at the same instance but not all (simultaneously) have authority to annotate the current command line. For example, all the operators may work on the same terminal session (which is treated as a document) at the same time, which includes making annotations, comments, entering date and time stamps, etc. Also, the aggregation layer 15 is configured to receive these annotations that are desired for the current command line from several operators at the same time at block 320.

Although the aggregation layer 15 can receive multiple annotations to the current command line, the aggregation layer 15 is configured to (only) grant (by request) one operator (e.g., the user client 10a) access to the current command line at a time for execution by the server 105 and/or blades 110. The aggregation layer 15 may receive the request for authority over the command line to be assigned the current command line user name at block 325. For example, the operator (which may be one or more) seeking access to the current command line user name 520 makes a request via their user client 10 to the aggregation layer 15. The aggregation layer 15 relays/transfers the request for the current command line user name 520 to all other operators (user clients 10) connected to the master session 515 for collaboration on the terminal session(s) at block 330. Assume that the operator of user client 10a makes a request. The user client 10a may be the only request and/or may be one of many requests for the current command line user name 520.

The aggregation layer 15 receives responses sent back from all other operators of user client 10 at block 335. The aggregation layer 15 determines whether there is agreement in the responses from each operator in the master session 515 at block 340. For example, the other operators on user clients 10b-10n can accept the request of the requesting operator on user client 10a to be designated the current command line user name 520. If yes, there is agreement from the operators to give the requesting operator access to the current command line user name 520, the aggregation layer 15 authorizes the requesting operator access to the current command line user name 520 at block 345. The agreement could be based on majority of the user clients 10, based on having 50% or more, based on having 75% or more, based on complete agreement of all user clients 10, etc. This operator (of user client 10a) now granted access to the current command line user name 520 is assigned authority to control (to the exclusion of the other operators) the current command line user name 520 by the aggregation layer 15.

The aggregation layer 15 takes the input from operator as the current command line user name 520 and provides the input to the server 105 and/or blades 110 for execution in the appropriate terminal session at block 350. When the current command line user name 520 applies (e.g., is assigned by the aggregation layer 15) to multiple terminal sessions (e.g., terminal sessions 1-1000) running on the server 105 and/or multiple blades 110, a single command entered for the current command line user name 520 is executed/applied across each of the terminal sessions (e.g., terminal sessions 1-1000). All of the operator participants utilizing their respective user client 10a-10n can monitor and observe the behavior of the respective server 105 and/or blades 110 for their respective terminal sessions; the operators can also annotate old command lines.

If no, there is not agreement from the operators to give the requesting operator access to the current command line user name 520, the aggregation layer 15 denies the requesting operator (of user client 10a) access to the command line at block 355 and flow returns to block 325.

FIG. 4 illustrates a flow chart 400 for session transfer of aggregated terminal sessions by the aggregation layer 15 according to an embodiment. There may be different operators (of user clients 10a-10n) that have different user sessions (corresponding to different terminal sessions), and each operator can transfer his or her user session via the aggregation layer 15 to another operator of the user client 10. Also, a single (operator of) user client 10a can transfer his or her user session to another user client 10b.

For example, the aggregation layer 15 saves a state for a current user session (being run on the user client 10) which includes saving (data of) server terminal sessions of server 105 and saving (data of) blade terminal sessions of the blades 110 for this current user session (corresponding to one or more terminal sessions) at block 405. The user session on, e.g., user client 10a corresponds to a terminal session (one or more) running on the server 105 and/or the blades 110. For example, the state for the current user session (i.e., corresponding to one or more server terminal sessions and/or corresponding to one or more blade terminal sessions) on user client 10a may be saved in the master session 515 by the aggregation layer 15. The state of the user session may include the various commands entered, the workloads monitored on the server 105, the processes monitored on the blades 110, which particular blades 1-N were monitored, how the server 105 and/or blades 110 responded to various commands, etc. Also, the state of the user session may identify that the operator of the current user session (e.g., on user client 10a) is the current command line user name 520, when this is the case; the state also identifies when the operator is not the current command line user name 520.

The aggregation layer 15 maintains the table 525 of current and future operators (users) and their respective user clients 10a-10n at block 410. For example, in addition to the operator on user client 10a, there may be other operators on user clients 10b-10n for the same terminal session (e.g., during session collaboration) and/or different terminal sessions on the server 105 and blades 110, and the table 525 maintains this information.

When the operator (e.g., on user client 10a) (and/or another operator) accesses/opens a terminal window/user session in the user client 10a, the aggregation layer 15 provides a list (from the table 525) of transferred user sessions (terminal sessions) for display at block 415. For example, the transferred terminal sessions (which can be blade terminal sessions running on blades 110 and/or server terminal sessions running on the server 105) have been transferred to the user client 10a from the other operators of user clients 10b-10n by the aggregation layer 15. The user clients 10b-10n may indicate to the aggregation layer 15 that their respective terminal sessions should be transferred to the user client 10a and/or the user client 10a may make a request to the aggregation layer 15 for the transfer. The operator on the user client 10a may access the aggregation layer 15 to receive the list of transferred server 105 terminal sessions and transferred blade 110 terminal sessions along with communication breakout windows at block 420. The breakout windows may include the a) blade session breakout, b) server to blade breakout, and/or the blade to server breakout discussed above.

Assume that there are many operators on user clients 10b-10n inputting commands and/or monitoring various blade terminal sessions running on the blades 1-N and various server terminal sessions running on the server 105. The terminal sessions (e.g., blade and server terminal sessions) for these operators on user clients 10b-10n would be listed and displayed to the user client 10a when the operator accesses its user client 10a for the transferred terminal sessions, and these terminal sessions of user clients 10b-10n can be transferred to the user client 10 via the aggregation layer 15.

The aggregation layer 15 allows the operator of the user client 10a to interact with any of the past and/or present (transferred) terminal sessions (on the server 105 and/or the blades 110) in the list of the table 525 at block 425. For example, the aggregation layer 15 is configured to allow the user client 10a to access, re-run, and/or modify any past and present (transferred) terminal sessions of the other user clients 10b-10n. Also, the aggregation layer 15 is configured to allow the past and present terminal sessions to be passed from one operator of, e.g., user client 10b to another operator of user client 10a. Therefore, along with monitoring, the control and current command line user name 520 of user clients 10b-10n can be given (transferred) to the user client 10a by the aggregation layer 15.

The aggregation layer 15 is configured to execute ownership transfer of the terminal sessions for online/real-time transfer of terminal sessions and/or offline transfer of the terminal sessions. For an online transfer, both the sender (of the ownership transfer) and receiver must be online and active users of the aggregation layer 15. For an offline transfer, the receiver may be offline but must be an active user of the system.

Figure 6:
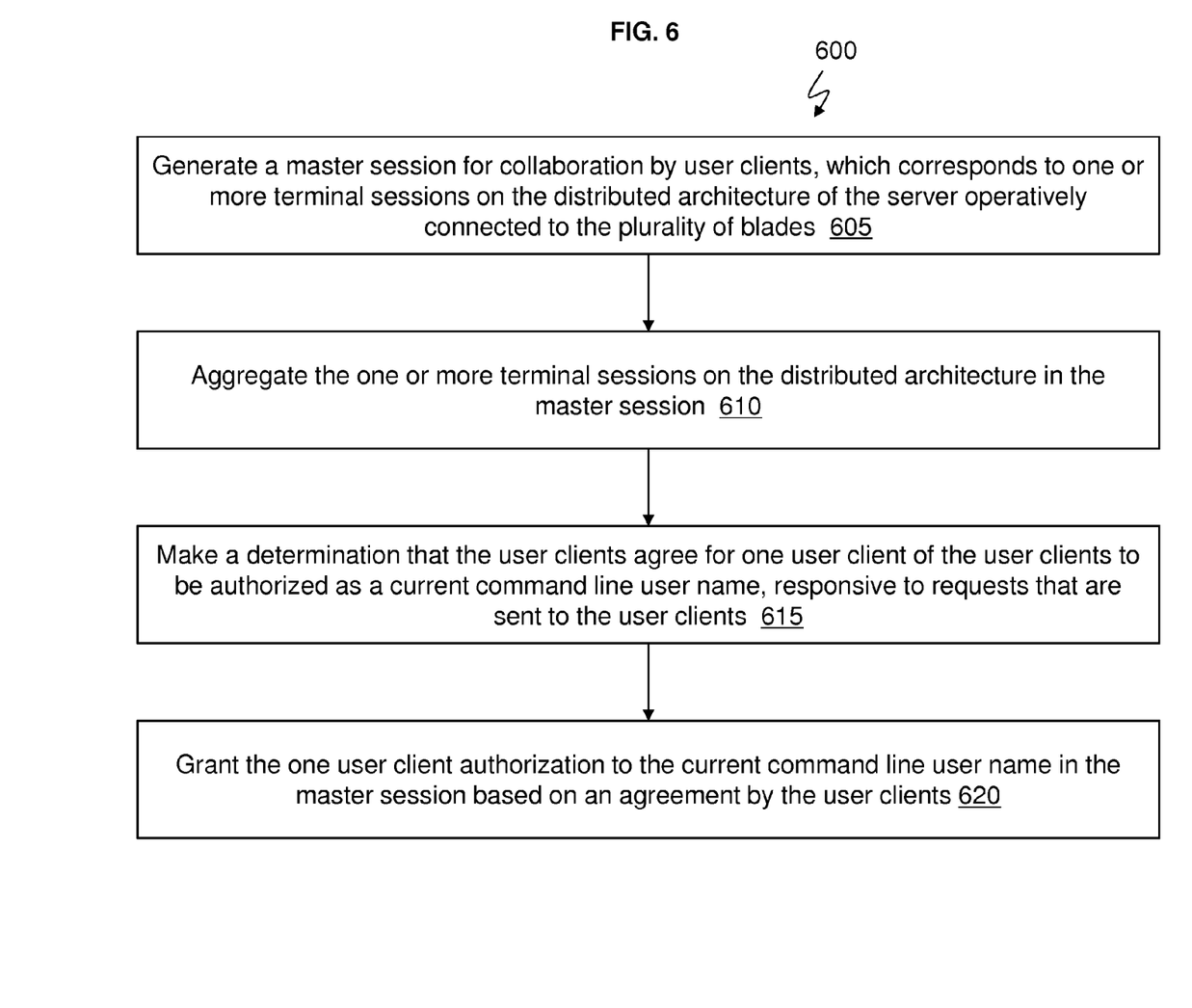
FIG. 6 illustrates a method for session collaboration in a distributed computer architecture according to an embodiment of the present invention.

FIG. 6 illustrates a method 600 for terminal session collaboration in a distributed architecture in which the server 105 is operatively connected to the blades 110 according to an embodiment.

The aggregation layer 15 is configured to generate the master session 515 for collaboration by user clients 10, in which the master session 515 corresponds to one or more terminal sessions in the distributed architecture of the server 105 operatively connected to the blades 110 at block 605.

The aggregation layer 15 is configured to aggregate the one or more terminal sessions on the distributed architecture of the server 105 and/or blades 110 in the master session 515 at block 610. The aggregation layer 15 makes a determination that the user clients 10 agree for one user client (such as user client 10a) of the user clients 10a-10n to be authorized as the current command line user name 520 (for the master sessions 515), responsive to requests that are sent to the user clients 10 at block 615.

The aggregation layer 15 is configured to grant the one user client (e.g., user client 10a) authorization to the current command line user name 520 in the master session 515 based on an agreement by the user clients 10 at block 620.

Further, one or more terminal sessions are running on the blades 110 as blade terminal sessions. The master session 515 of the aggregation layer 15 is configured to permit the user clients 10 to directly interact with the plurality of blades through a switch to at least one of: breakout communication traffic from the plurality of blades to the server, breakout communication traffic from the server to the plurality of blades, and breakout processes running on the plurality of blades.

The one or more terminal sessions are running on one blade 1 of the plurality of blades 110. In another case, the one or more terminal sessions are respectively running on the server 105 and blades 110.

The user clients 10 are remote to the distributed architecture, and the user clients 10 are on remote computer systems 120.

Ownership of the current command line user name 520 is configured to be passed from the one user client 10 to another user client 10 by the aggregation layer 15. Also, the master session 515 permits the user clients 10 to view workloads and command the workloads running on the server 105, and the master session 515 permits the user clients 10 to view processes and command the processes running on individual blades 1-N of the blades 110.

The aggregation layer 15 permits a user session of the one user client 10a to be transferred to another user client 10b, and the aggregation layer 15 provides a list (e.g., in table 525) of all transferred user sessions to the other user client 10b. The aggregation layer 15 is configured to aggregate one or more terminal sessions running on the server 105 and individual blades 1-N of the blades 110 to display into a single user session on user client 10. As such, the commands input in the current command line user name 520 apply to each of the one or more terminal sessions on the distributed architecture; execution of the commands by the server 105 and/or the individual blades 1-N, along with results of the execution of the commands, are provided for display to the user clients.

Figure 7:
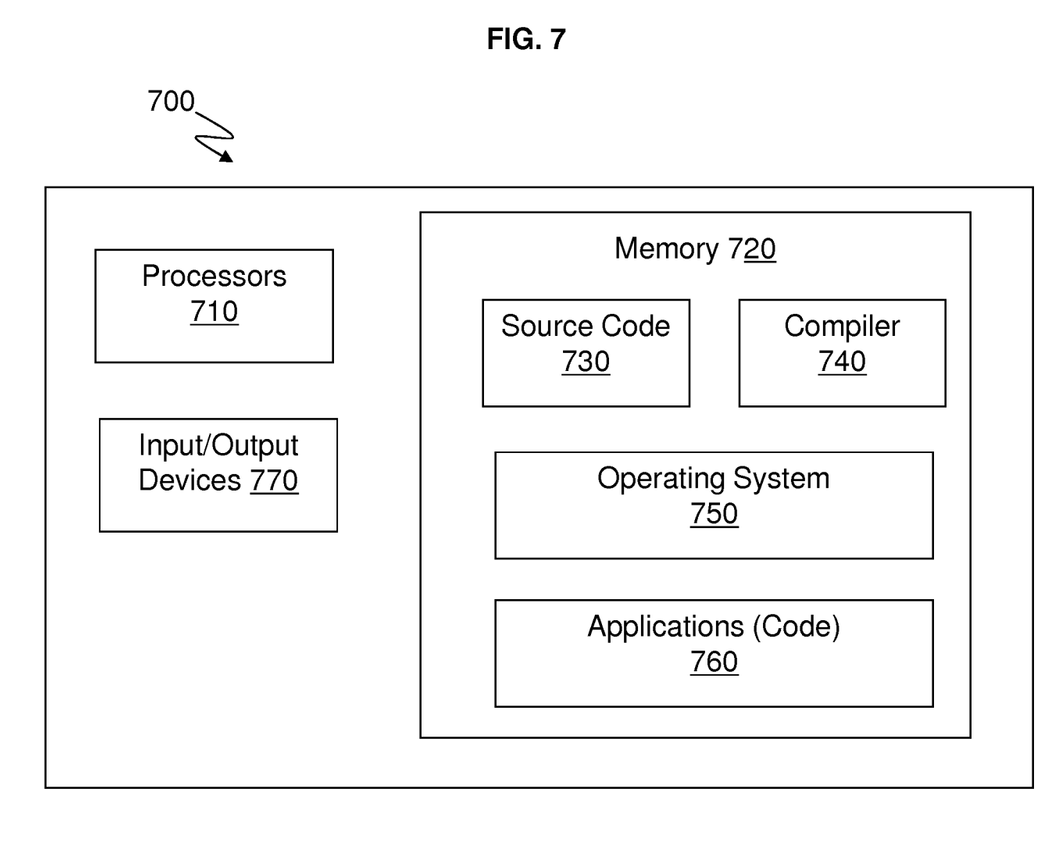
FIG. 7 illustrates an example of a computer having capabilities, which may be utilized in accordance with exemplary embodiments of the present invention.

FIG. 7 illustrates an example of a computer 700 having capabilities, which may be included in exemplary embodiments. Various methods, procedures, modules, flow diagrams, tools, application, circuits, elements, and techniques discussed herein may also incorporate and/or utilize the capabilities of the computer 700. Moreover, capabilities of the computer 700 may be utilized to implement features of exemplary embodiments discussed herein. One or more of the capabilities of the computer 700 may be utilized to implement, to connect to, and/or to support any element discussed herein (as understood by one skilled in the art) in FIGS. 1-6.

Generally, in terms of hardware architecture, the computer 700 may include one or more processors 710, computer readable storage memory 720, and one or more input and/or output (I/O) devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the memory 720. The processor 710 can be virtually any custom made or commercially available processor, a central processing unit (CPU), a data signal processor (DSP), or an auxiliary processor among several processors associated with the computer 700, and the processor 710 may be a semiconductor based microprocessor (in the form of a microchip) or a macroprocessor.

The computer readable memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor 710.

The software in the computer readable memory 720 may include one or more separate programs, each of which comprises an ordered listing of executable instructions for implementing logical functions. The software in the memory 720 includes a suitable operating system (O/S) 750, compiler 740, source code 730, and one or more applications 760 of the exemplary embodiments. As illustrated, the application 760 comprises numerous functional components for implementing the features, processes, methods, functions, and operations of the exemplary embodiments. The application 760 of the computer 700 may represent numerous applications, agents, software components, modules, interfaces, controllers, etc., as discussed herein but the application 760 is not meant to be a limitation.

The operating system 750 may control the execution of other computer programs, and provides scheduling, input-output control, file and data management, memory management, and communication control and related services.

The application(s) 760 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. Furthermore, the application 760 can be written as (a) an object oriented programming language, which has classes of data and methods, or (b) a procedure programming language, which has routines, subroutines, and/or functions.

The I/O devices 770 may include input devices (or peripherals) such as, for example but not limited to, a mouse, keyboard, scanner, microphone, camera, etc. Furthermore, the I/O devices 770 may also include output devices (or peripherals), for example but not limited to, a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or an intranet. The I/O devices 770 may be connected to and/or communicate with the processor 710 utilizing Bluetooth connections and cables (via, e.g., Universal Serial Bus (USB) ports, serial ports, parallel ports, FireWire, HDMI (High-Definition Multimedia Interface), etc.).

When the computer 700 is in operation, the processor 710 is configured to execute software stored within the memory 720, to communicate data to and from the memory 720, and to generally control operations of the computer 700 pursuant to the software. The application 760 and the O/S 750 are read, in whole or in part, by the processor 710, perhaps buffered within the processor 710, and then executed.

When the application 760 is implemented in software it should be noted that the application 760 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 760 can be embodied in any computer-readable medium 720 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 720 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical).

In exemplary embodiments, where the application 760 is implemented in hardware, the application 760 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 700 includes non-limiting examples of software and hardware components that may be included in various devices, servers, and systems discussed herein, and it is understood that additional software and hardware components may be included in the various devices and systems discussed in exemplary embodiments.

Figure 8:
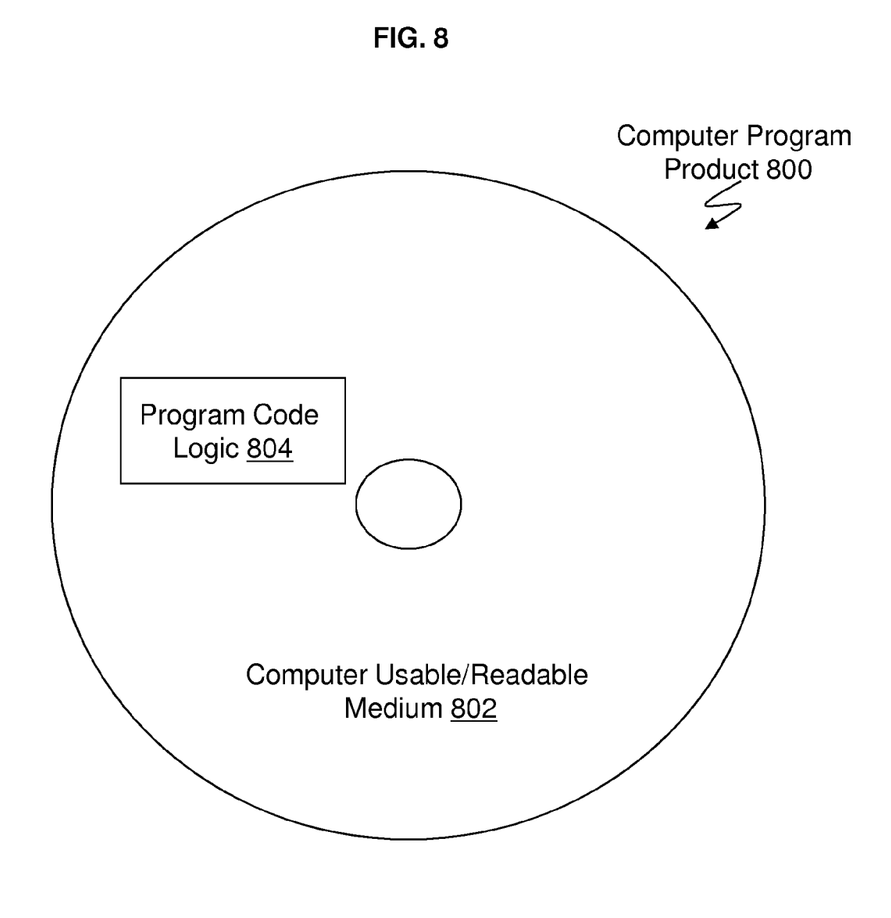
FIG. 8 illustrates an example of a computer program product on a computer readable/usable medium with computer program code logic embodied in tangible media as an article of manufacture.

As described above, embodiments can be embodied in the form of computer-implemented processes and apparatuses for practicing those processes. An embodiment may include a computer program product 800 as depicted in FIG. 8 on a computer readable/usable medium 802 with computer program code logic 804 containing instructions embodied in tangible media as an article of manufacture. Exemplary articles of manufacture for computer readable/usable medium 802 may include floppy diskettes, CD-ROMs, hard drives, universal serial bus (USB) flash drives, or any other computer-readable storage medium, wherein, when the computer program code logic 804 is loaded into and executed by a computer, the computer becomes an apparatus for practicing the invention. Embodiments include computer program code logic 804, for example, whether stored in a storage medium, loaded into and/or executed by a computer, or transmitted over some transmission medium, such as over electrical wiring or cabling, through fiber optics, or via electromagnetic radiation, wherein, when the computer program code logic 804 is loaded into and executed by a computer, the computer becomes an apparatus for practicing the invention. When implemented on a general-purpose microprocessor, the computer program code logic 804 segments configure the microprocessor to create specific logic circuits.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer system for session aggregation in a distributed architecture comprising a server operatively connected to a plurality of blades, the system comprising:

a processing circuit, and memory operatively connected to the processing circuit, the system configured to perform a method comprising:

generating, by the processing circuit, a master session for collaboration by user clients, the master session corresponds to one or more terminal sessions on the distributed architecture of the server operatively connected to the plurality of blades;

wherein the one or more terminal sessions run on the server and the plurality of blades in order to permit the user clients to input commands, view workloads, and view processes running on the server and the plurality of blades;

aggregating the one or more terminal sessions on the distributed architecture into a single terminal session in the master session;

making a determination that the user clients agree for one user client of the user clients to be authorized as a current command line user name in the master session because all of the user clients cannot simultaneously access the current command line user name at one time, responsive to requests that are sent to the user clients; and granting the one user client authorization to access the current command line user name in the master session based on an agreement by the user clients;

wherein the user clients respectively have individual session identifications;

wherein the master session is configured to aggregate all of the individual session identifications into a single session identification as a single user client instead of multiple user clients;

wherein the master session allows all of the user clients to collectively interact with the one or more terminal sessions as the single client in order to collectively monitor and observe the server and the plurality of blades;

wherein the single terminal session is configured to allow the one user client, having previously been granted authorization based on the agreement by the user clients, to issue a single command in the current command line user name in the master session, such that the single command is applied across each of the one or more terminal sessions that are executing on the server and the plurality of blades while the user clients monitor and observe behavior of the server and the plurality of blades executing of the single command.

2. The computer system of claim 1, wherein the one or more terminal sessions are running on the plurality of blades as blade terminal sessions;

wherein the master session is configured to permit the user clients to directly interact with the plurality of blades through a switch that bypasses the server to at least one of:

breakout communication traffic from the plurality of blades to the server;

breakout communication traffic from the server to the plurality of blades; and breakout processes running on the plurality of blades;

wherein the plurality of blades are separate from the server;

wherein the server is configured to offload the processes to the plurality of blades;

wherein the switch is between the server and the plurality of blades, such that the user clients in the master session are allowed to monitor and observe via the switch.

3. The computer system of claim 1, wherein the one or more terminal sessions are running on one blade of the plurality of blades.

4. The computer system of claim 1, wherein the one or more terminal sessions are respectively running on the server and the plurality of blades.

* * * * *